United States Patent Office 3,446,966
Patented May 27, 1969

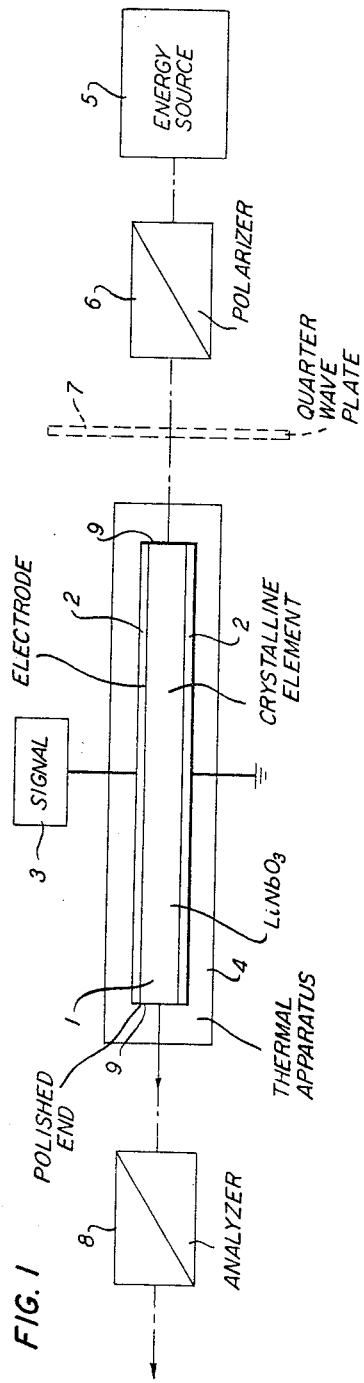
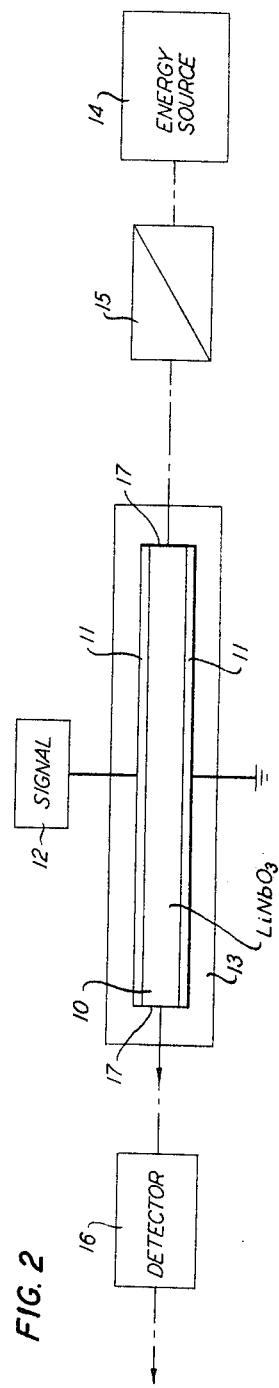

3,446,966
OPTICAL LiNbO₃ MODULATOR
George E. Peterson, Plainfield, N.J., assignor to Bell
Telephone Laboratories, Incorporated, New York, N.Y.,
a corporation of New York
Filed July 28, 1965, Ser. No. 475,513
Int. Cl. H04b 9/00; H01s 3/00
U.S. Cl. 250—199   9 Claims

ABSTRACT OF THE DISCLOSURE

Useful electro-optic modulators with active lithium meta niobate crystals are possible at elevated temperatures.

---

This invention is directed to modulating devices useful for the modulation of electromagnetic wave energy particularly over the wavelength range of from 4.5 microns to .4 micron. For convenience, the devices of this invention are referred to as electro-optic modulators herein, even though their range extends substantially beyond the light spectrum in either direction.

The invention of the laser coherent light source has opened up exciting prospects in the communications field, as a result of which there has been continuing intensive activity directed to the development of the various necessary associated circuit elements for use in such a system. In the modulator field, there have been proposed devices based on essentially every interaction known between light and other forms of energy. These have included magneto-optic, elasto-optic, piezo-optic, and electro-optic effects. The electro-optic mechanism is perhaps the most popular of those proposed and has much to recommend it. Firstly, it is in the form of electric energy that the modulating influence is normally present. Secondly, the mechanism is one which manifests itself at room temperature and in a large variety of materials. Thirdly, the effect is usable at high frequencies.

Perhaps the best known of the electro-optic materials is KDP (potassium dihydrogen phosphate), and at this time several suppliers offer modulators made of this material as regular articles of commerce. Other materials such, for example, as KTN (potassium tantalate-potassium-niobate), zinc sulfide, and ADP (ammonium dihydrogen phosphate), have been investigated and have been reported in the literature. Certain of these have properties comparable to those of KDP. Certain of them appear to be vastly superior in terms of the degree of modulation which may be achieved with a given variation in voltage. Unfortunately. KDP and the comparable organic materials suffer from their well-known physical characteristics, i.e., they are water-soluble and thermally unstable. Large perfect crystals of the water-insoluble materials are not presently commercially available.

In accordance with this invention, it has been discovered that lithium meta-niobate (LiNbO₃), when maintained at a temperature of at least 50° C., exhibits a significant electro-optic effect of device capability. This effect may be utilized in modulators operating on any of the usual principles and, accordingly, the invention includes such devices, resulting in amplitude variation, phase variation, frequency variation, and polarization variation.

Lithium meta-niobate modulators are useful for the modulation of electromagnetic energy over the entire spectrum at which the material is substantially transparent. Since the absorption at both ends of the range increases gradually as a function of frequency, this bandwidth may be substantially broadened depending on the loss that can be tolerated. Experimentation thus far indicates that modulation frequency of the D.C. to well over a hundred megacycles can be achieved.

From the material standpoint, the characteristics of lithium metaniobate are well known. This material is water-insoluble, is unaffected by most acids and bases, and is hard and gem-like and therefore easily fabricated into useful optical configurations. It has been known for some time that large single crystals of the material can be grown by common seeded growth techniques such as crystal pulling. Recently, it was discovered that substantially single domain crystals could be reproducibly grown by modifications of such techniques. See Applied Physics Letters Aug. 1, 1965, "Ferroelectric Behavior of Lithium Niobate," K. Nassau and H. J. Levinstein.

As compared with KDP, lithium meta-niobate may show a useful transverse electro-optic effect. That is, the direction of the imposed electric field may be normal or non-parallel to the light transmission direction. When used in this fashion, the magnitude of the interaction may be enhanced by increasing the transmission length as well as by decreasing the crystal thickness over which the field is imposed. Experiments have indicated that for a given size crystal and given field the electro-optic coefficient in lithium meta-niobate is considerably larger than that in KDP. Since the useful electro-optic effect in KDP is necessarily longitudinal (field parallel to transmission direction), it is apparent that varying the size of the crystal element has no effect. Varying the size of the lithium meta-niobate crystal, on the other hand, results in a degree of modulation which is proportional to the product of the fraction $l/t$, where $l$ is length of crystal in the transmission direction and $t$ is thickness of crystal in the electric field direction. Eighth wave retardations are observable in a KDP crystal of seven millimeters in length and three millimeters thick, with application of several thousand volts, and in a lithium meta-niobate crystal of these dimensions with somewhat lower applied fields. This effect may be seen in lithium meta-niobate at a tenth of this field merely by increasing the length of the crystal ten times.

The dielectric constant for lithium meta-niobate varies from 30 to 80, depending on frequency and the direction in which it is measured, a range of values comparable to that of KDP so that it may be used in a vast class of configurations for which this material is known to be suitable. Optically, the material is water-white and of a transparency comparable to that of window glass. Crystallographically, the material to the use of which this invention is directed is of crystal class 3m. According, the $c$ direction is non-birefringent and is the preferred direction for light transmission in most of the devices herein, although other directions are permitted and, indeed, for certain designs are required. For the preferred direction of light transmission, the optimum field direction lies in the plane normal to the $c$ axis. Virtually all other directions within the crystal, either parallel or non-parallel to the transmission direction, are permitted for the field, although the size of the coefficient may be somewhat reduced by deviating from a perpendicular direction.

A description of the invention is expedited by reference to the drawing, in which:

FIG. 1 is a schematic representation of an electroptic modulator utilizing lithium meta-niobate as the active element; and FIG. 2 is a schematic representation of an alternate form of modulator herein.

Referring again to FIG. 1, the modulator depicted consists of active lithium meta-niobate element 1, having polished ends 9 and provided with electrode 2, which may be constituted of a fired silver paste layer and across which there is imposed a modulating electric field produced by modulating voltage source or signal source 3 so as to cause a variation in refractive index. Crystalline element 1 is provided with an encompassing thermal apparatus 4 which may take the form of a resistance heater or any other means capable of maintaining crystalline body 1 at a temperature of at least 50° C. Associated elements included in the depicted aparatus include light source 5, polarizer 6, optionally a quarter wave plate 7, and analyzer 8.

Energy source 5 for significant communication purposes generally takes the form of a coherent light source such as a laser. Polarizer 6 is a polarization element. This element is oriented in such fashion as to secure maximum modulation which may be determined in the manner described in my article in Applied Physics Letters, volume 5, pages 62 et seq. In other terms, the polarization direction of element 6 is at 45 degrees to an axis of the indicatrix ellipse of element 1.

The optional element 7, which may constitute a thin cleaved layer of mica or any other material of such dimension as to constitute a quarter wave plate for the frequency of electromagnetic energy to be modulated, serves to "optically bias" element 1 so that the variation in transmission is approximately linearly dependent on applied field. This element is considered optional, since its function may be performed by a D.C. bias across electrodes 2. It may be positioned before or after element 1. The use of the quarter wave plate is generally preferred for two reasons: (1) The need for separating the D.C. and A.C. fields across electrode 2 is avoided; and (2) a constant bias, possibly resulting in electrolysis problems, is avoided. Light or other electromagnetic energy, having been produced by element 5 and having been polarized by element 6, then passes through lithium meta-niobate element 1, and upon emerging contains the information introduced by means of the signal produced by element 3 in the form of optical sidebands. The energy may at this stage be passed through an analyzer 8 and then be transmitted to a receiver, not shown, or, in the alternative, may be directly transferred to such a receiver, which is provided with an element performing the function of analyzer 8. In either event, this element is desirably oriented to produce the maximum intensity variation. This may be achieved simply by rotating the element until optimum conditions are achieved, or its position may be calculated in accordance with well-known principles. Relative to polarizer 6, analyzer 8 is preferably a crossed polarizer.

FIG. 2 depicts a modulator, the active element of which is a crystalline body 10 of lithium meta-niobate, having polished ends 17 and provided with electrodes here designated 11, across which there is produced a modulating signal generated by element 12. As in all devices in accordance with this invention, it is necessary to provide a a thermal apparatus here designated 13 required to maintain element 10 at a temperature of at least 50° C. Electromagnetic energy to be modulated is produced by laser or other source 14 and is passed through polarizer 15 before being transmitted through element 10. When the apparatus is operated as a phase modulator, polarizer 15 is oriented with its polarization direction coinciding with either axis of the indicatrix ellipse produced in element 10. Any other orientation permits operation as a polarization modulator. Upon emerging from element 10, this energy is phase modulated. The information on the wave may be extracted by means of a phase demodulator or other detector 16. Element 16, shown to complete the system depicted, is the receiver.

It has been observed that the interaction so pronounced at 50° C. is further enhanced at higher temperatures. From the standpoint of expediency, it is likely that an operating temperature of the order of 75 to 125° C. will be preferred, since operation in this manner results in an appreciable interaction and offers, too, a level at which the device may be conveniently stabilized. The interaction is further strengthened at higher temperatures; and, where required, operation at levels of 500° C. and higher may prove practical. For most purposes, however, operation at this level or higher is impeded by the low resistance and accompanying power losses.

While the essential element has been discussed in terms of lithium meta-niobate, and while it is on the interaction produced by this material that the invention is premised, it is to be understood that the composition may deviate from stoichiometry by a few percent or may include as impurities or intentionally added ingredients up to of the order of about five percent by weight of the composition. Some such ingredients may be added, for example, to secure single domain material, or to alter the birefrigence.

The invention, of necessity, has been described in terms of a limited number of embodiments. Invention resides in the discovery of a pronounced interaction between electromagnetic energy within the wavelength range including from about 4.5 to about .4 micron and an electric field in a crystal of lithium meta-niobate when maintained at a temperature of at least 50° C. This observation gives rise to a multitude of device applications. Some of these devices operate on principles which have been specifically discussed. Others do not. All such devices, whether present or potential, are to be considered included within the scope of the inventive claims where they take advantage of the interaction upon which the invention is based.

What is claimed is:

1. Modulator comprising an optical source of electromagnetic radiation, an element consisting essentially of lithium meta-niobate, the said element being provided with two polished surfaces, together with means for maintaining said element at a temperature of at least 50° C. and means for producing an electric field across the said element, so as to cause a variation in refractive index.

2. Modulator comprising an element consisting essentially of lithium meta-niobate, the said element being provided with two polished surfaces, together with means for maintaining said element at a temperature of at least 50° C., together with a optical source of electromagnetic radiation for producing polarized energy, so arranged that such energy is transmitted in a direction defined by the said polished surfaces through the said element, and means for producing an electric field across the said element, so as to cause a variation in refractive index.

3. Modulator of claim 2, in which the said electromagnetic wave energy is of a wavelength range of from 4.5 microns to .4 micron.

4. Modulator of claim 2, together with detection means for sensing a change in transmitted energy dependent on the said variation in refractive index.

5. Modulator of claim 4, in which the detection means includes a polarizer having a polarization direction normal to that of the said energy.

6. Modulator of claim 5, in which the transmission path intermediate the said source and the said detection means includes a quarter wave plate.

7. Modulator of claim 4, in which the said detection means is polarization sensitive, and in which there is interposed in the transmission path intermediate the said source and the said element a polarizer having polarization direction differing from the axes of the indicatrix ellipse of the said element.

8. Modulator of claim 7 in which the polarization direction corresponds with an axis of the indicatrix ellipse.

9. Modulator of claim 1, together with means for maintaining said element at a temperature of at least 75° C.

References Cited

UNITED STATES PATENTS

| Re. 25,632 | 8/1964 | Boyle | 250—199 |
|---|---|---|---|
| 3,262,058 | 7/1966 | Ballman | 330—4.5 |

OTHER REFERENCES

Ken Gilmore, Electronics World, Lasers and Their Uses, December 1962, pp. 29–32.

ROBERT L. GRIFFIN, *Primary Examiner.*

ALBERT J. MAYER, *Assistant Examiner.*

U.S. Cl. X.R.

332—7.51